United States Patent [19]

Riuli et al.

[11] 4,150,845

[45] Apr. 24, 1979

[54] CAPTURED NUT COUPLING

[75] Inventors: Arduino E. Riuli, Wayne; Bernard F. Kopacz, Little Falls, both of N.J.

[73] Assignee: Becton, Dickinson and Company, Rutherford, N.J.

[21] Appl. No.: 842,056

[22] Filed: Oct. 14, 1977

Related U.S. Application Data

[63] Continuation-in-part of Ser. No. 747,773, Dec. 6, 1976, abandoned.

[51] Int. Cl.² ............................................. F16L 19/00
[52] U.S. Cl. .................................. 285/81; 285/334.4; 285/388; 285/DIG. 22
[58] Field of Search ................. 285/384, 353, 81, 388, 285/387, DIG. 22

[56] References Cited

U.S. PATENT DOCUMENTS

| | | | |
|---|---|---|---|
| 1,830,674 | 11/1931 | Peck | 285/387 X |
| 2,263,655 | 11/1941 | Stettner | 285/388 |
| 2,374,138 | 4/1945 | Sanford | 285/353 X |
| 2,728,895 | 12/1955 | Quackenbush et al. | 285/81 X |
| 3,001,802 | 9/1961 | Rebman et al. | 285/353 X |
| 3,428,337 | 2/1969 | Read | 285/353 X |
| 3,488,073 | 1/1970 | Wold | 285/388 |
| 3,633,944 | 1/1972 | Hamburg | 285/81 |
| 3,679,237 | 7/1972 | DeAngelis | 285/353 X |
| 3,901,574 | 8/1975 | Paullus et al. | 285/81 X |

FOREIGN PATENT DOCUMENTS

| | | | |
|---|---|---|---|
| 1904479 | 8/1970 | Fed. Rep. of Germany | 285/387 |
| 1357046 | 2/1964 | France | 285/81 |

*Primary Examiner*—Thomas F. Callaghan
*Attorney, Agent, or Firm*—Kane, Dalsimer, Kane, Sullivan and Kurucz

[57] ABSTRACT

The disclosure is of a captured nut coupling particularly adapted to join two articles and to convey fluids between the joined articles. The coupling is a fastener comprising a split ring inner or male member and a solid retaining and locking outer or female member. The male and female members are locked together after the male member is connected to one of the articles to be joined. In one embodiment the inner male member bears an inner rib which rotatably engages a groove in one of the articles for connection and the outer female member includes a means for engaging the other article for connection.

10 Claims, 11 Drawing Figures

CAPTURED NUT COUPLING

CROSS-REFERENCE TO RELATED APPLICATION

This application is a continuation-in-part of pending application Ser. No. 747,773 filed Dec. 6, 1976 and now abandoned.

BACKGROUND OF THE INVENTION

1. Field of the Invention

The invention relates to means and methods of coupling fluid-carrying articles and more particularly relates to a coupling for joining such articles.

2. Brief Description of the Prior Art

The art is replete with descriptions of coupling means and methods for joining fluid-carrying tubular articles in gas tight relationships. Representative of the state of the art are the disclosures of U.S. Pat. Nos. 1,596,645; 2,386,562; 2,819,097; 3,591,205; and 3,633,944.

In general, the prior art coupling devices and means have not been completely satisfactory for all purposes or circumstances. Many couplers consist of a plurality of component parts which must be carefully assembled prior to or during installation. Other units require special tools and/or training for installation. Still other coupling devices are costly to fabricate, requiring exotic materials and/or rigid specifications and narrow structural tolerances. Many coupling devices can only be assembled in factory lines using heavy and costly capital equipment.

The present invention provides a coupler and means of coupling fluid-carrying articles which is simple, efficient, relatively inexpensive and saving of time and labor. The coupling consists of two simple parts which may be manually installed without the use of tools or heavy machinery. The couplers may be fabricated so economically as to lend themselves to use with disposable articles, i.e.; articles such as medical inhalation equipment which desirably is used once and then disposed of. Other advantages of the invention will be described hereinafter.

SUMMARY OF THE INVENTION

The invention comprises a captured nut coupling for joining fluid-carrying articles, which comprises;

(a) a coupling male member characterized by
  (1) a body having first and second open ends and a first axial bore communicating between said ends;
  (2) a split in said body, extending from said first end to said second end, said split upon spreading permitting the expansion of said bore in diameter; and
  (3) means on the inner wall of said body for engaging an inserted article;
(b) a coupling female member characterized by;
  (1) a body having third and fourth open ends and which defines a second axial bore communicating between said third and fourth ends, said second bore being adapted to receive said male member;
  (2) means for connecting said fourth end to an article; and
(c) means associated with male and female members for locking said male member in the second bore of said female member whereby spread of said split is prevented and expansion of the first axial bore is prevented;

the first end of said male member being mounted in said second bore through said third end of said female member.

The term "captured nut coupling" as used herein means that the coupling nut is permanently affixed to one of the articles to be coupled, i.e.; affixed in such a manner that it cannot be removed without substantial destruction of the coupling or the article. The advantage is a fool-proof; loss-proof operation when coupling of two articles is desired.

DETAILED DESCRIPTION OF THE PREFERRED EMBODIMENTS OF THE INVENTION

An understanding of the invention may be conveniently obtained by a reading of the following description of the preferred embodiments in conjunction with the accompanying drawings of FIGS. 1–9, inclusive.

Figure 1:
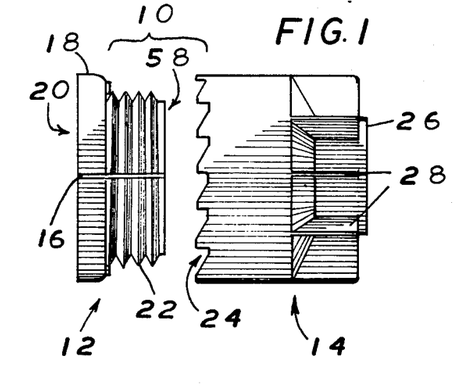
FIG. 1 is a side view of a coupler embodiment of the invention, prior to final assembly.
Figure 2:
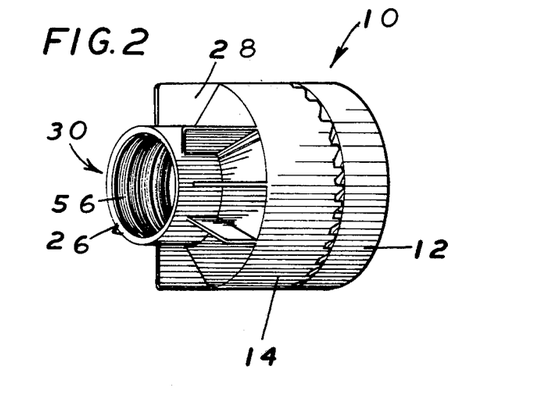
FIG. 2 is a view in perspective of the embodiment of FIG. 1 following final assembly.

FIG. 1 is a side elevation of a preferred coupler 10 of the invention shown disassembled. Coupler 10 comprises a coupling male member 12 and a coupling female member 14. Male member 12 is a cylindrical or tubular body having a split 16 in the sidewall. The split permits one to spread the walls of member 12, thereby expanding the diameter of the bore traversing member 12. The bore cannot be seen in FIG. 1 except through split 16. In the preferred embodiment of FIG. 1, a flange 18 is disposed about the periphery of end 20. The outer surface of the preferred tubular member 12 bears threads 22. The coupling female member 14 is also a tubular member having a first end 24 and a second end 26. A bore traverses the interior of member 14 providing communication between ends 24, 26. This bore cannot be seen in FIG. 2. In the preferred member 14, end 26 bears circumferentially wrench or finger grasping blades 28 to assist in rotating member 14 as will be hereinafter described more fully. Referring now to FIG. 2, a view in perspective of the embodiment of FIG. 1 but following final assembly, that portion of bore 30 beginning at end 26 of female member 14 may be seen. As viewed through end 26, threads 56 may be observed. Threads 56 function to mate with and receive the male member of a second article to be connected by coupler 10. A portion of the bore 30 sidewalls in female member 14 at end 24 is threaded (threads not seen in FIGS. 1 or 2) for mating with and receiving threads 22 of male member 12. As shown in FIG. 2, member 12 threads into member 14 to provide a single coupler 10 through which axial central bore 30 passes. The bore in each of the members 12 and 14 are axially aligned to form a continuous bore 30.

Figure 3:
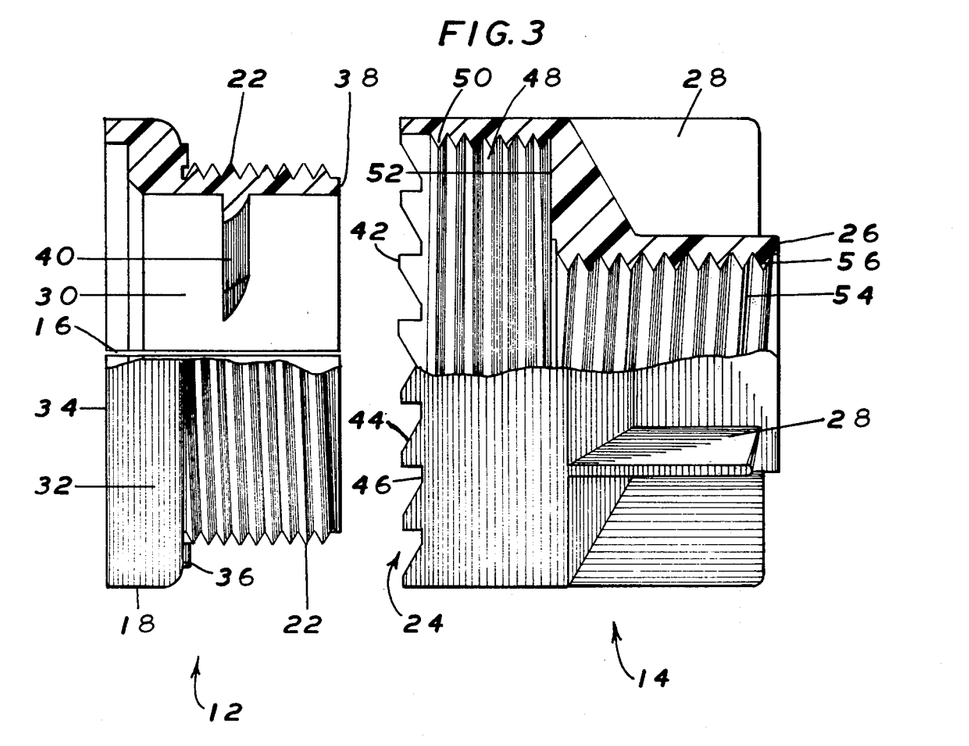
FIG. 3 is an enlarged cross-sectional in part side elevation of the embodiment of FIG. 1.

FIG. 3 is an enlarged, cross-sectional in part, side elevation of the embodiment 10 as shown in FIG. 1, providing further details of construction. As seen in FIG. 3, flange 18 has an outer surface 32, a lower surface 34 and an upper peripheral surface 36. End 38 of member 12 is a sealing surface. Projecting into bore 30 of member 12 from the interior wall thereof is an interrupted annular rib 40. End 24 of female member 14 bears a series of ratchet teeth 42 circumscribing its periphery. Each tooth 42 has an inclined caming surface 44 to assist rotation of the member 14 against a locking surface, in one direction only. Slots 46 between teeth 42 engage a locking surface when members 12, 14 are engaged as hereinafter described. The inner walls of female member 14 define axial bore 30 together with member 12 when 12, 14 are assembled. The bore defined by member 14 alone comprises two zones. Zone 48 bears threads 59 cut into the walls of member 14. The threads 50 are adapted to engage threads 22 of member 12 and zone 48 is adapted to threadedly receive male member 12. When fully received in female member 14, annular sealing surface 38 of male member 12 forms a seal with sealing surface 52 which is an integral part of the tubular body forming member 14. The sealing surface 52 also divides interior zone 48 from an interior zone 54 of reduced diameter. It is not necessary to the function of the coupling of the invention that a seal be formed between surfaces 38 and 52 since the fluid tight connection may be achieved between the coupled ends of the two articles joined by the coupler, i.e.; by bringing the ends together. Zone 54 bears threads 56 cut into the inner walls of member 14. Threads 56 function to engage a tubular article in connection as will be described more fully hereinafter.

Figure 4:
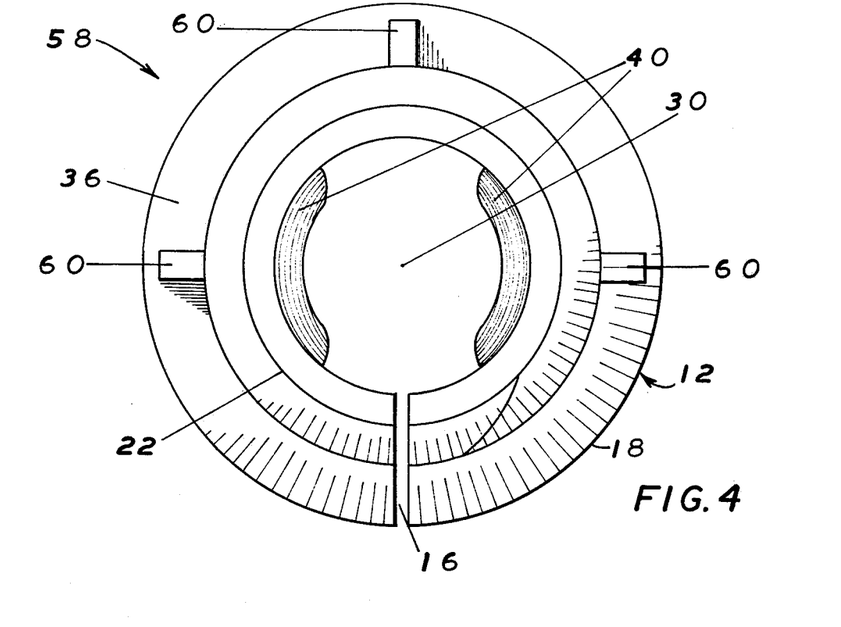
FIG. 4 is an end view of the left hand component of the embodiment of FIG. 1 as viewed from the right hand side.

Referring now to FIG. 4, further details of the end 58 (which is the end distal to end 20) of male member 12 may be seen. Upper surface 36 of flange 18 has mounted thereon locking lugs 60 which in cooperation with ratchet teeth 42 of female member 14 serves as a means of locking members 12, 14 together when the two members are assembled.

Figure 5:
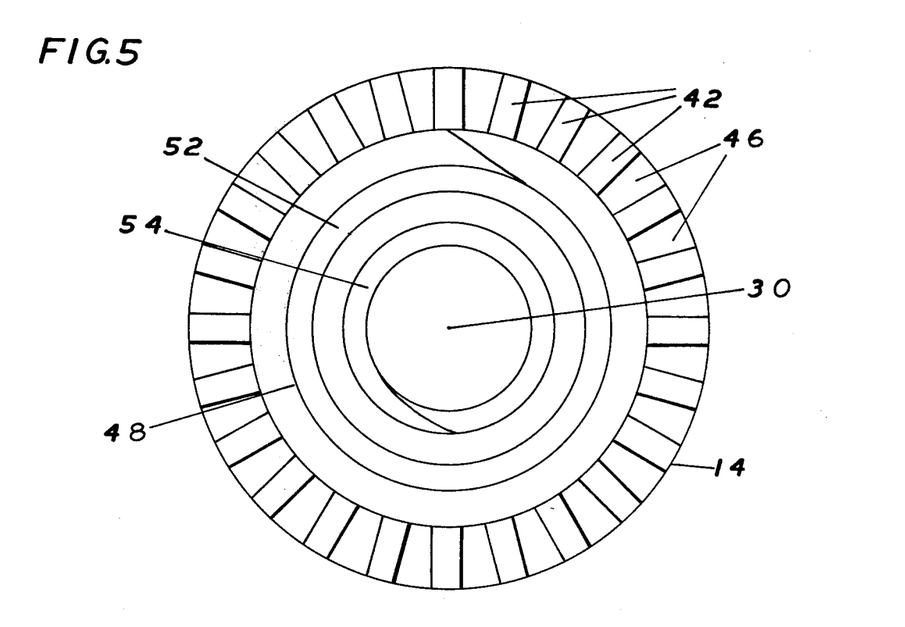
FIG. 5 is an end view of the right hand component of the embodiment of FIG. 1 as viewed from the left hand side.

FIG. 5 is a view of end 24 of female member 14 and shows the relationship of ratchet teeth 42, sealing surface 52 and interior zones 48 and 54.

Figure 6:
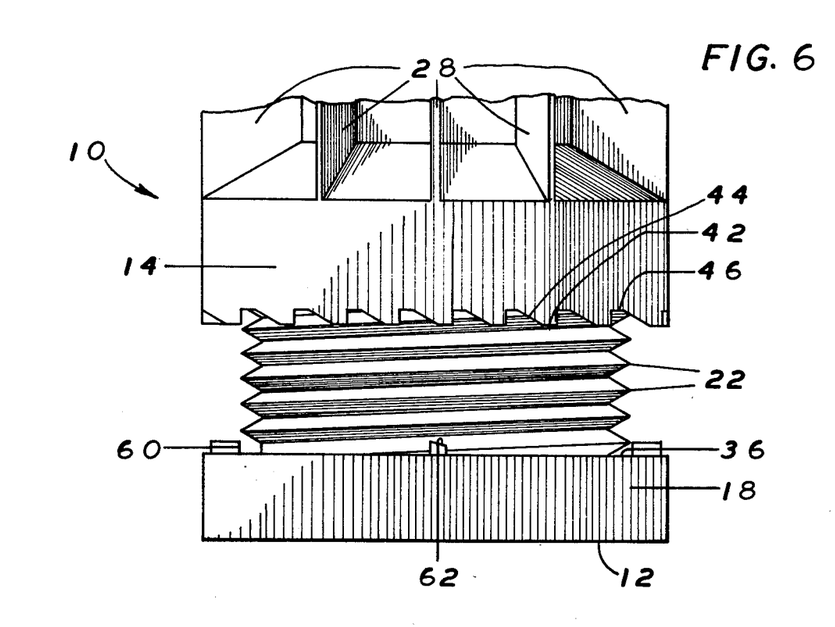
FIG. 6 is a fragmentary side elevation of the embodiment of FIG. 1 shown during final assembly.
Figure 7:
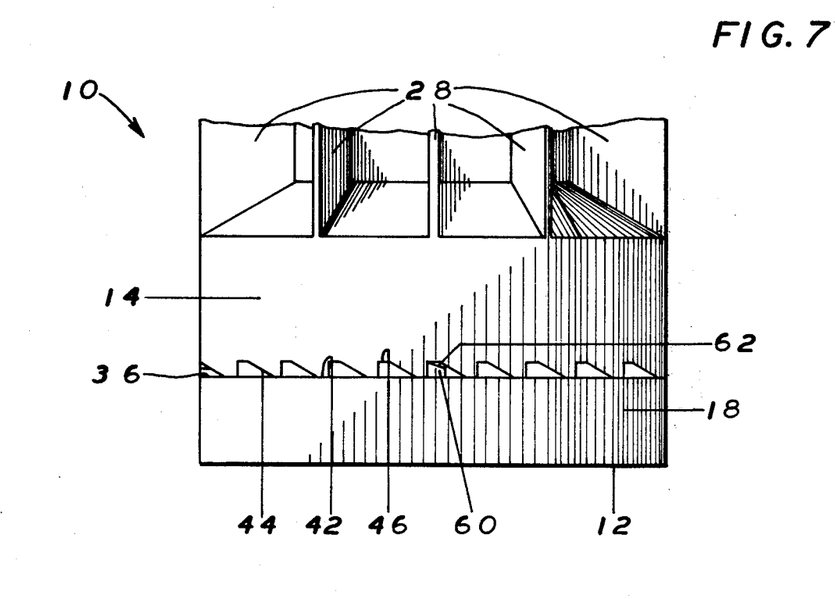
FIG. 7 is a view as shown in FIG. 6 but after final assembly.

Referring now to FIGS. 6 and 7, the assembly of male member 12 with female member 14 will be observed. The end 22 of member 12 is inserted into end 24 of member 14 and members 12 and/or 14 rotated to thread male member 12 into the zone 48 of female member 14. When fully threaded into zone 48, members 12, 14 are auto-locked together so the members 12, 14 cannot be counter-rotated and separated. This is accomplished by positioning of locking lugs 60 in slots 46 against ratchet teeth 42. As shown in FIG. 7, end 24 of member 14 fully seats on the upper surface 36 of flange 18. Locking of lugs 60 with teeth 42 is facilitated during threading of members 12, 14 together by cam surfaces 44 on teeth 42 and cam surfaces 62 on locking lugs 60. The respective cam surfaces 44, 62 cooperate with each other to facilitate forward rotation of the members and to deny counter-rotation after engagement. The wrench or finger gripping blades 28 also facilitate rotating the member 12 and/or 14 to assemble the members 12, 14 together.

Figure 8:
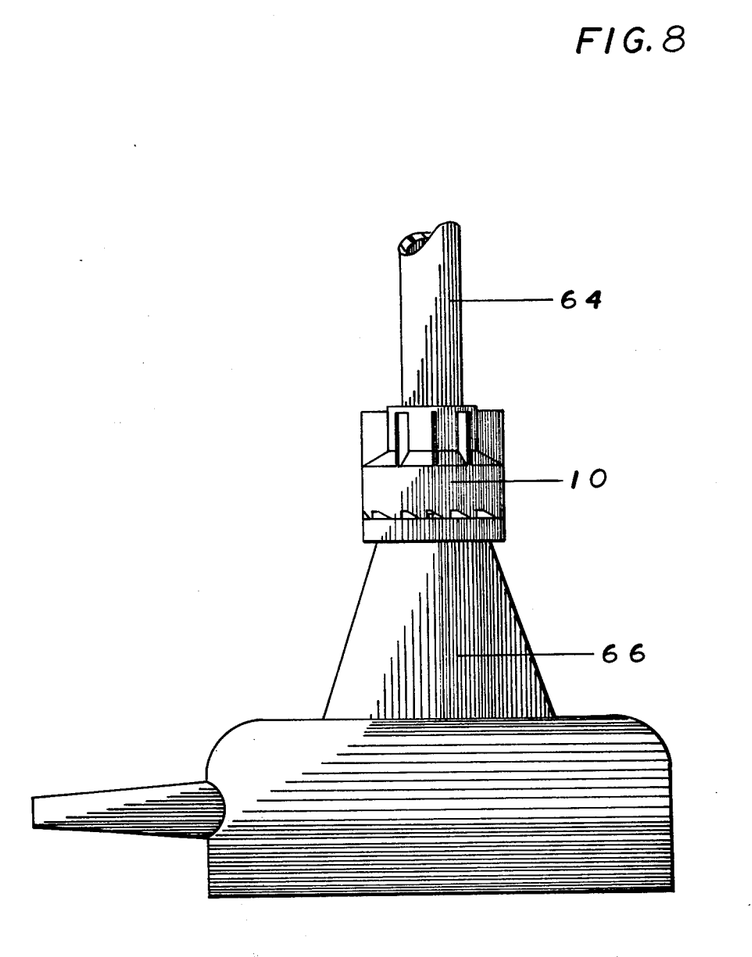
FIG. 8 is a view in perspective of the embodiment of FIG. 1 shown joining two fluid-carrying tubular articles.

FIG. 8 shows the assembled coupler 10, coupling and joining a tubular conduit 64 to a tubular appliance 66 in a sealing relationship. In this relationship, coupler 10 effects a fluid-tight coupling of conduit 64 to appliance 66 which permits the passage of a fluid between tubular conduit 64 and tubular appliance 66 without leaking.

Figure 9:
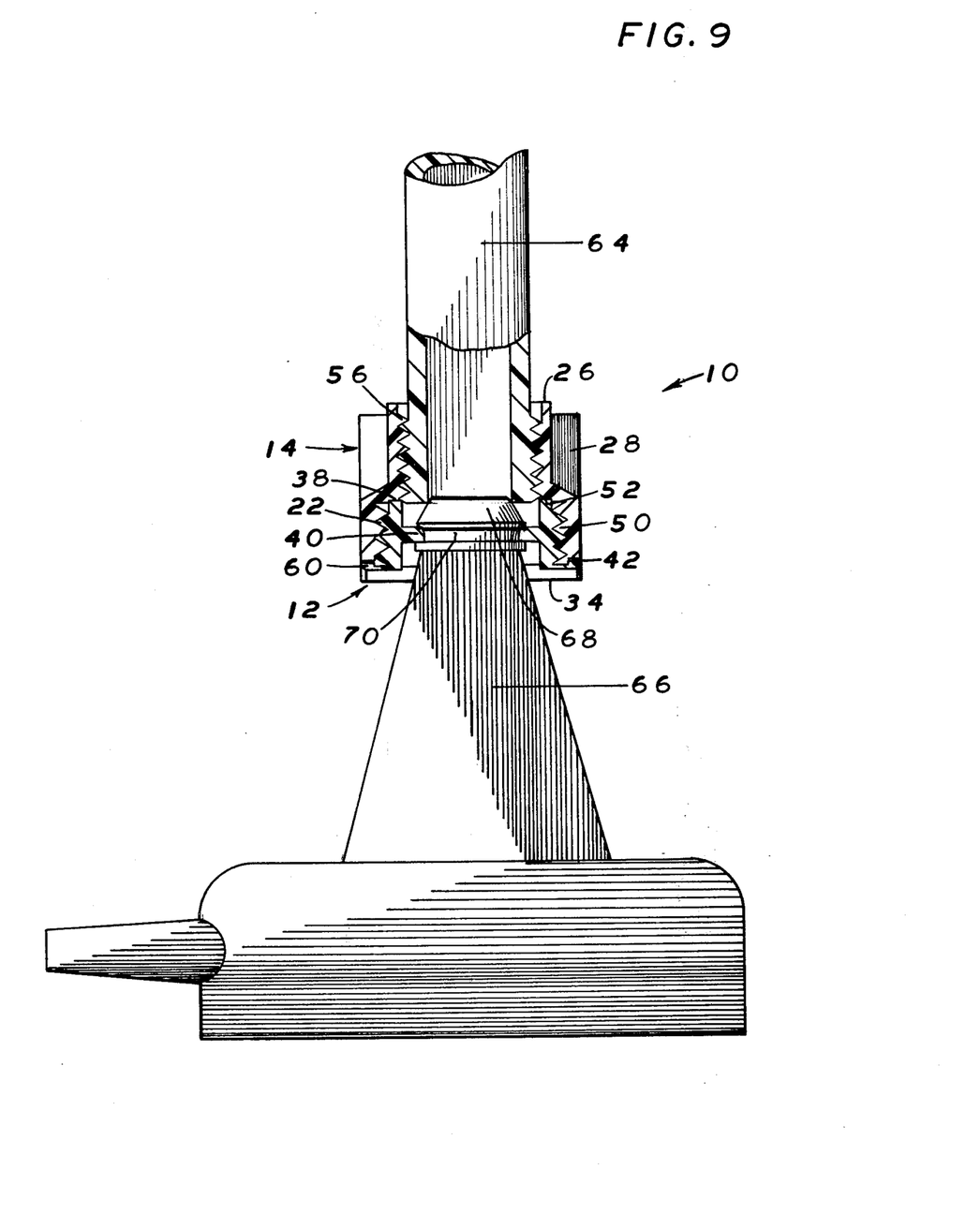
FIG. 9 is a cross-sectional in part view of the embodiment shown in FIG. 8.

Referring now to FIG. 9, a cross-sectional in part view of the embodiment shown in FIG. 8, further details of the preferred embodiment 10 will be observed. As shown in the FIG. 9, male member 12 effects connection with tubular appliance 66 by mounting on tubular throat 68. Mounting is effected by engagement of rib 40 in groove 70 of throat 68. The male member 12 is mounted on throat 68 prior to complete assembly of the coupler 10, i.e.; before male member 12 is threaded into female member 14. The split 16 in the body of male member 12 facilitates spreading of the tubular body, thereby expanding the diameter of bore 30 so that male member 12 may be readily mounted on throat 68 without the necessity of using special tools. With male member 12 securely and rotatably mounted on throat 68, the male member 12 is threaded into female member 14 as previously described to complete assembly of the coupling. In doing so, female member 14, upon locking in place as previously described, prevents spreading of split 16. In this locked condition, the coupling 10 cannot be readily removed from throat 68 without substantially destroying either the coupling or the appliance 68. The other end 26 of coupler 10 can then be threadedly engaged with tubular conduit 64 in normal fashion to complete the joining of conduit 64 to tubular article 66.

The coupler 10 may be fabricated from conventional materials generally employed in the manufacture of fluid-conveying connectors such as metals, plastics and the like. Preferably the coupler 10 is fabricated from a thermoplastic or thermosetting synthetic polymeric resin such as high density polyethylene or polypropylene and most preferably from a mineral filled synthetic polymeric resin composition having high strength such as a mineral filled nylon.

Figure 10:
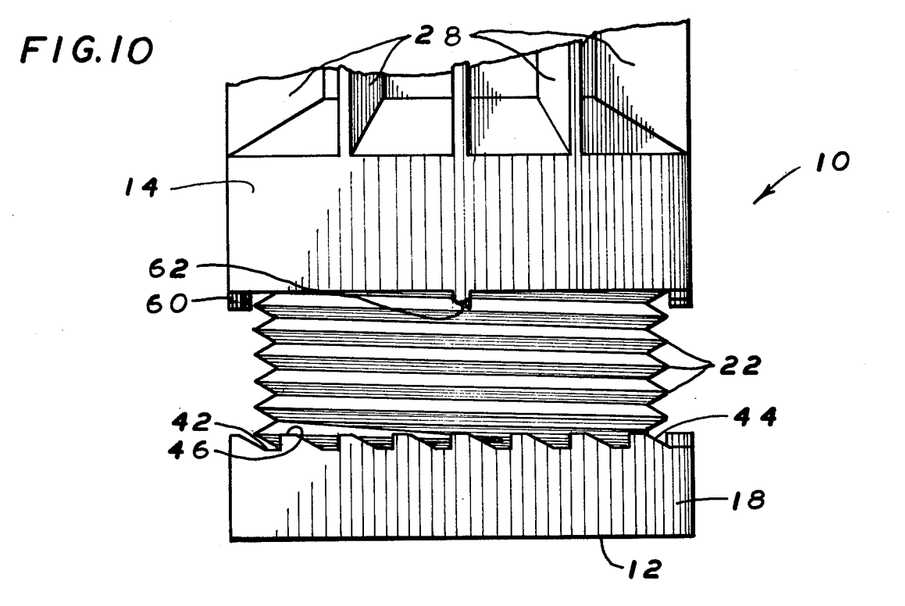
FIG. 10 is a view similar to FIG. 6 but of an alternate embodiment.
Figure 11:
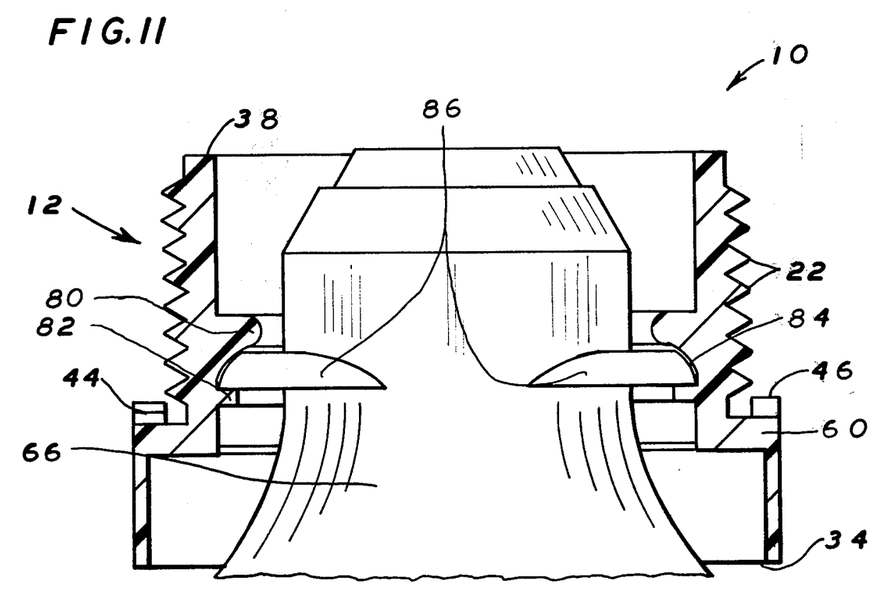
FIG. 11 is a cross-sectional in part side elevation of an alternate means of connection of the coupler to a tubular article.

Those skilled in the art will appreciate that many modifications may be made to the above-described embodiments without departing from the spirit and the scope of the invention. For example, as shown in FIG. 10, a view similar to that of FIG. 6, an alternate embodiment may be seen wherein lock lugs 60 are located on the end of female member 14 instead of on the end of male member 12 as shown in FIG. 6 and said lugs engage to lock with ratchet teeth 42 located on the male member 12 instead of the female member 14 as previously described and shown in FIG. 6. As a further example and referring to FIG. 11, an alternate means of effecting connection of the male member 12 to a tubular article 66 may be seen. In the embodiment of FIG. 11, the inner wall of male member 12 bears a continuous upper rib 80 and a continuous lower rib 82 which together define a groove or channel 84. The ribs 80, 82 engage and hold an interrupted rib 86 in channel 84. Interrupted rib 86 is an integral part of article 66 and serves as a connection with male member 12.

What is claimed is:

1. A captured nut coupling for affecting a fluid tight joining of two fluid-carrying articles, which comprises;
   (a) a coupling male member characterized by:
   (1) a flange around the periphery of the second open end adapted to stop against the third end of the female member described below a one-piece, unitary body having first and second open ends and a first axial bore communicating between said ends;
   (2) a split in said body, extending from said first end to said second end, said split upon spreading permitting the expansion of said bore in diameter; and
   (3) means on the bore wall of said body for rotatably mounting said body on a cooperating first article when inserted in the first axial bore;
   (b) a coupling female member characterized by;
   (1) a body having third and fourth open ends and which defines a second axial bore communicating between said third and fourth ends, said second bore being adapted to receive said male member;
   (2) means for connecting said fourth end to a fluid carrying second article; and
   (c) means associated with the male and female members for permanently locking said male member in the bore of said female member whereby the spread of said split is prevented and expansion of the first axial bore is prevented, said locking means preventing rotation of the male member relative to the female member and preventing axial movement of the male member in the second axial bore;
   (d) whereby when the first end of said male member is mounted and locked in said second bore through said third end of said female member, the captured nut is rotatably secured to the first article and permanently locked thereon.

2. The coupling of claim 1 wherein said means (a) (3) is an interrupted ring.

3. The coupling of claim 1 wherein said means for connecting said fourth end to an article comprises threads within said second axial bore.

4. A coupling according to claim 1 wherein said means for locking comprises ratchet teeth on said third end and a locking lug on the periphery of said second end of the male member.

5. A coupling according to claim 1 wherein said means for locking comprises ratchet teeth on said second end of the male member and a locking lug on said third end.

6. A coupling according to claim 1 wherein said means (a) (3) is a pair of spaced apart ribs defining a channel adapted to receive an interrupted ring on said inserted article.

7. A captured nut coupling for affecting a fluid tight joining of two fluid-carrying articles, which comprises;
   (a) a coupling male member characterized by;
   (1) a first one-piece, cylindrical body having first and second open ends and which defines a first axial bore communicating between said ends;
   (2) a split in said first body, extending from said first end to said second end;
   (3) a thread on the outer surface of said first body adjacent said first end;
   (4) a flange radially disposed about the periphery of said second end, said flange presenting upper, lower and outer surfaces; and
   (5) a rib projecting from the inner wall of said body into said bore; and
   (b) a coupling female member characterized by;
   (1) a second body having third and fourth open ends and which defines a second axial bore communicating between said third and fourth ends;
   (2) said second bore having a first zone adjacent said third end and a second zone adjacent said fourth end;
   (3) means in said second zone for removably attaching said female member to a first tubular article;
   (4) a thread in the body wall of said first zone, adapted to receive and mate with the thread of said male member; and
   (5) means cooperating between the male and female members for engaging the flange of said male member with the third end of said female member in permanently locked relationship so that when said male member is threadedly mounted in said first zone of said female member, said male member cannot be dismounted by unthreading.

8. The coupling of claim 7 wherein said rib is an interrupted ring.

9. The coupling of claim 7 wherein said means in said second zone are threads cut in the inside walls of said female member.

10. The coupling of claim 7 wherein said means for engaging the flange of the male member comprises ratchet teeth on said third end, said teeth being adapted to engage a locking lug on the upper side of said flange.

* * * * *

UNITED STATES PATENT OFFICE
CERTIFICATE OF CORRECTION

Patent No. 4,150,845            Dated April 24, 1979

Inventor(s) Arduino E. Riuli et al.

It is certified that error appears in the above-identified patent and that said Letters Patent are hereby corrected as shown below:

Column 5, lines 5-10 should read --- (1) a one-piece, unitary body having first and second open ends a flange around the periphery of the second open end adapted to stop against the third end of the female member described below and a first axial bore communicating between said ends; ---.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*